United States Patent [19]
Gibson

[11] Patent Number: 5,512,920
[45] Date of Patent: Apr. 30, 1996

[54] LOCATOR DEVICE FOR CONTROL OF GRAPHICAL OBJECTS

[75] Inventor: Sarah F. F. Gibson, Arlington, Mass.

[73] Assignee: Mitsubishi Electric Research Laboratories, Inc., Cambridge, Mass.

[21] Appl. No.: 291,667

[22] Filed: Aug. 17, 1994

[51] Int. Cl.⁶ ................................................. G09G 5/08
[52] U.S. Cl. .................................... 345/163; 345/167
[58] Field of Search .......................... 345/157, 163, 345/156, 126, 121, 167; 382/46; 395/137

[56] References Cited

U.S. PATENT DOCUMENTS

| | | | |
|---|---|---|---|
| 4,759,075 | 7/1988 | Lipkie et al. | 382/46 |
| 4,827,413 | 5/1989 | Baldwin et al. | 345/126 |
| 4,917,516 | 4/1990 | Retter | 345/163 |
| 5,263,135 | 11/1993 | Dei | 395/137 |
| 5,298,919 | 3/1994 | Chang | 345/163 |

Primary Examiner—Curtis Kuntz
Assistant Examiner—Vivian W. Chang
Attorney, Agent, or Firm—Robert K. Tendler

[57] ABSTRACT

A three degree-of-freedom locator device for the control of graphical objects on a computer display mimics natural two-dimensional movement of the user's hand by providing for simultaneous translation and rotation of the graphical object. In one embodiment, a computer mouse-type locator with two trackball and position-encoder sensor systems detects movement of the locator over a stationary pad or like device. The graphical object is selected by a mouse button click. Subsequent two-dimensional translation and rotation of the locator are detected by the dual trackball system and used to control the position and orientation of the graphical object. The result is intuitive control of the placement of the selected object on the computer screen. The natural movement of the mouse in the user's hand is transformed into simultaneously translation and rotation of the object.

14 Claims, 13 Drawing Sheets

LOCATOR DEVICE FOR CONTROL OF GRAPHICAL OBJECTS

FIELD OF INVENTION

This invention relates to locator devices for the control of graphical displays and more particularly to a device which permits simultaneous two-dimensional (2D) translation and rotation of a graphical object, or simultaneous control of position and direction of the gaze or viewpoint in a virtual environment.

BACKGROUND OF THE INVENTION

Many graphics applications require the user to interactively position graphical objects on the computer screen. This positioning is frequently done with an input device known as a locator device. Examples of such devices include the computer mouse, data tablet, touch panel, 2D joystick, or trackball. These 2D locator devices have only two degrees of freedom, requiring the user to control 2D translations separately from 2D rotations. Unfortunately, this separation of rotation and translation is clumsy and somewhat counter-intuitive for control of object placement.

For example, in a typical CAD/CAM or computer drawing application, it is often necessary not only to position the graphical elements or icons by linear translation but also to rotate the elements or icons for proper presentation on the screen. Present drawing and graphical systems accomplish the translation and rotation of an object or element using two separate input modes. In the first input mode, the object or element is selected by the mouse or other locator, and then translated to a new position by mimicking subsequent movement of the locator device. In the second input mode, the object or element is selected, a center of rotation is established, and movements of the locator device are translated into rotation of the object or element about the selected center of rotation.

An example of one embodiment of rotation of graphical objects is the MacDraw system offered by Apple computer. In this system, the rotational input mode is selected from the appropriate menu and then a mouse click over the graphical element selects the element and automatically determines the center of rotation. This automatic selection of the center of rotation depends on the class of the selected graphical object. The user has little or no control over the location of the center of rotation. Subsequent movement of the mouse results in rotation of the object about this predetermined center of rotation. Another graphical rotation method is embodied in the Adobe PhotoShop system. In this method, one of a set of rotations listed in 10 degree increments is selected from a menu. In another version of this method, also embodied in the Adobe PhotoShop system, rotation angles are selected from an icon depicting arrows or rotation vectors which graphically represent a finite list of possible rotation angles.

It will be appreciated that all of the above mentioned schemes for placement of a graphical element require separate control of rotation and translation. Hence they are extremely cumbersome for drawing and design applications and completely impractical for applications which require real-time, interactive control of object or viewpoint placement.

More particularly, a computer mouse has a sensor which detects either absolute position (x, y) or position displacement ($\Delta x$, $\Delta y$). The detected position or displacement is input to the computer and can be used to control the location of a graphical object on the computer screen. Sensors of position or displacement can be: optical, detecting light reflected from a patterned mouse pad; mechanical, detecting movement of the mouse using encoders on a roller on the base of the mouse; or electromagnetic, sensing absolute position over a grid of active wires embedded in a tablet.

Prior locator devices detect 2D position or displacement of the mouse with a single sensor, or a single sensor system, that records either the position pair, (x, y), or the displacement pair, ($\Delta x$, $\Delta y$). Rotation of the mouse about the sensor is not detected. Because the sensor monitors only 2 variables, x and y, or $\Delta x$ and $\Delta y$, prior systems have only 2 degrees of freedom and are incapable of simultaneous control of position and orientation of graphical elements. Instead, conventional locator devices require that position and orientation of graphical objects be separately controlled. This is typically done by having two separate input modes for the locator device. In the first mode, mouse movements are interpreted as object translations. In the second mode, the mouse movements are converted into rotation about a pre-selected origin, which can either be implicit or set explicitly by the user. Switching between these modes can be relatively clumsy and can not be done quickly enough for real-time applications.

SUMMARY OF THE INVENTION

In order to alleviate the complexity and cumbersome nature of prior systems for translating and rotating a graphical element or object, the subject invention provides a computer mouse-type locator device which enables simultaneous 2D rotation and translation of graphical objects. Using this device, the graphical object's position and orientation is made to mimic the position and orientation of the locator device. In this way, both 2D rotations and translations of the users hand are directly translated into corresponding motions of the selected graphical object. This form of control provides an intuitive and simple interface for graphical object positioning.

Current 2D locator devices include a single sensor or a single sensor system which detects a pair of absolute positions, (x1, y1) or a pair of displacements, ($\Delta x1$, $\Delta y1$). Examples of such sensor systems include a trackball with two orthogonally placed displacement encoders or a light pen and a tablet with an encoded grid. In the subject locator device, a second sensor or sensor system is placed on the locator device at a position which is physically separated from the first sensor. This second sensor or sensor system provides necessary and sufficient information required for simultaneous 2D translation and rotation. The subject design detects pairs of absolute positions, (x1, y1) and (x2, y2), or pairs of displacements, ($\Delta x1$, $\Delta y1$) and ($\Delta x2$, $\Delta y2$). By adding the second sensor system, the subject locator device now has the required three degrees of freedom. Hence, the inputs from the subject locator device, in addition to a pre-set center of rotation, enable both position and orientation to be updated simultaneously.

Given the subject hardware design, there are several possible software solutions for converting the position or displacement pairs into object placement. The optimal software solution for a given situation will be application dependent. The important contribution of the proposed locator device design is the information required for simultaneous control of 2D translation and rotation. Several software strategies could easily be developed to customize an application's response to movements of the locator device.

There are various applications for the subject locator device which span many areas of computer graphics, computer design, and virtual reality. Examples from three important areas are listed below.

With respect to computer assisted drawing, art, and desktop publishing, the subject locator device may be used with supporting software to interactively position and orient graphical objects, designs, text, pictures, and photographs on a canvas or image. The subject locator device offers an advantage over existing devices because it enables intuitive and interactive placement of the objects and eliminates the need for using separate modes to translate and rotate the objects.

With respect to interactive graphics applications, it will be noted that applications which involve 2D object manipulation or maneuvering through 2D space benefits from the intuitive interface that is enabled by the subject device. Examples of computer games that benefit from this technology include virtual jig saw puzzles, and 2D maze traversal. Examples in manufacturing include interactive assembly of 2D machine parts and graphical testing of insertability. Examples in computer assisted surgery include pre-surgical planning involving sizing and placement of implants relative to a pre-surgical medical image.

Finally, it will be appreciated that the subject locator device may be used to great advantage to control the 2D position and angle of the viewpoint for a individual moving or walking through a virtual reality scene. In an interactive, immersive virtual reality environment, it is extremely important that viewpoint control be simple and intuitive. In many virtual reality applications, viewpoint control is accomplished by tracking the 3D head position of the user with either an external or head-mounted device. However, it will be appreciated that in many situations, such as virtual architectural walk-throughs or the exploration of virtual worlds, the user's feet remain on the floor and maneuvering through the space mostly requires positioning and orienting the person in the 2D floor space. Hence, in these applications, the subject locator device provides a simple, inexpensive and single-handed input device that enables users to guide themselves through virtual environments.

In summary, a three degree-of-freedom locator device for the control of graphical objects on a computer display mimics natural 2D movement of a user's hand by providing for simultaneous translation and rotation of the graphical object. In one embodiment, a computer mouse-type locator with two trackball and position-encoder sensor systems detects movement of the locator over a stationary pad or like device. The graphical object is selected with a mouse button click and subsequent 2D translation and rotation of the locator are mimicked by the graphical object. The result is intuitive placement of the selected object on the computer screen by transforming the natural movement of the mouse in the user's hand into simultaneously translation and rotation of the object. The subject locator device has applications in many areas of computer graphics, computer-aided design, and virtual reality.

BRIEF DESCRIPTION OF THE DRAWINGS

These and other features of the subject invention will be better understood taken into conjunction with the Detailed Description in conjunction with the Drawings of which.

DETAILED DESCRIPTION

Prior 2D locator devices include a single sensor or a single sensor system which detects a pair of absolute positions, ($x1$, $y1$) or a pair of displacements, ($\Delta x1$, $\Delta y1$). Examples of such sensor systems include a trackball with two orthogonally placed displacement encoders or a light pen and a tablet with an encoded grid. The purpose of the encoding system is to determine trackball rotation and to be able to translate trackball rotation into x and y displacements.

Figures 1A, 1B:
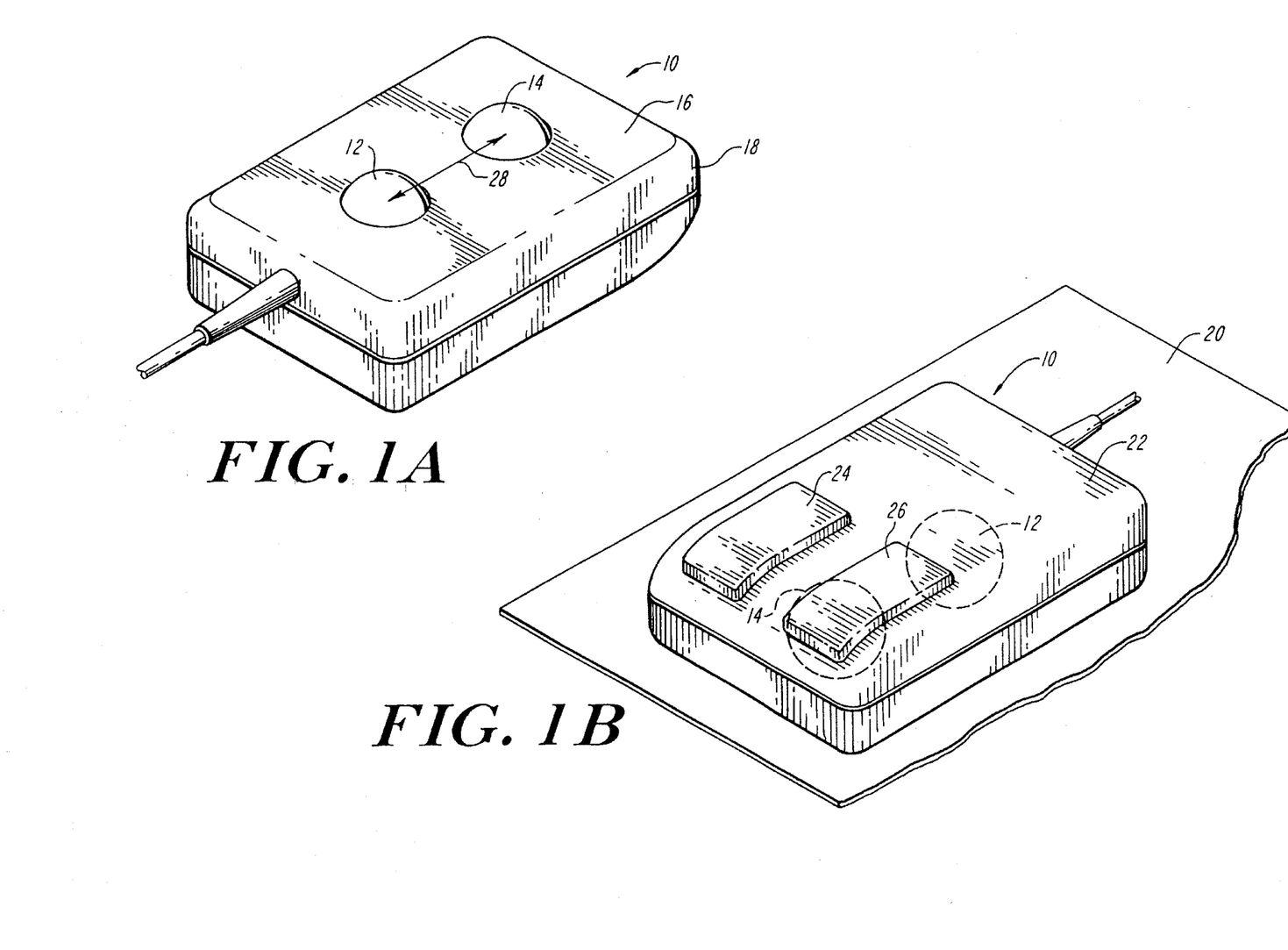
FIGS. 1A and 1B are respectively bottom and top views of a dual trackball mouse for control of object translation and rotation on a display via a single mouse movement.

In this embodiment, the dual trackball mouse of FIGS. 1A and 1B includes a pair of trackballs 12 and 14 which project from a bottom surface 16 of mouse housing 18. When the mouse is inverted, the trackballs co-act with a surface 20, causing the trackballs to rotate within their respective housings as mouse 10 is moved across surface 20. As can be seen, a top surface 22 of mouse 10 has a pair of switches or buttons, 24 and 26, which are utilized in the normal manner to click on an object on a screen to indicate or select a graphical object on the screen.

As illustrated by arrow 28 in FIG. 1A, the second sensor or sensor system is placed on the locator device at a position which is physically separated from the first sensor. This second sensor or sensor system provides the third degree of freedom required for simultaneous 2D translation and rotation. The subject design detects, and inputs to a computer 30 of FIG. 3 via connection 32, pairs of absolute positions, ($x1$, $y1$) and ($x2$, $y2$), or pairs of displacements, ($\Delta x1$, $\Delta y1$) and ($\Delta x2$, $\Delta y2$ ). These inputs, in addition to a preset center of rotation, enable both position and orientation to be updated simultaneously. It will be appreciated that the center of rotation of an object on a screen can be established explicitly by a mouse click on the desired position on the graphical display or implicitly by pre-specifying a point on the screen or the graphical object. For example, the center of mass could be established a priori as the object's center of rotation.

Figures 2, 3:
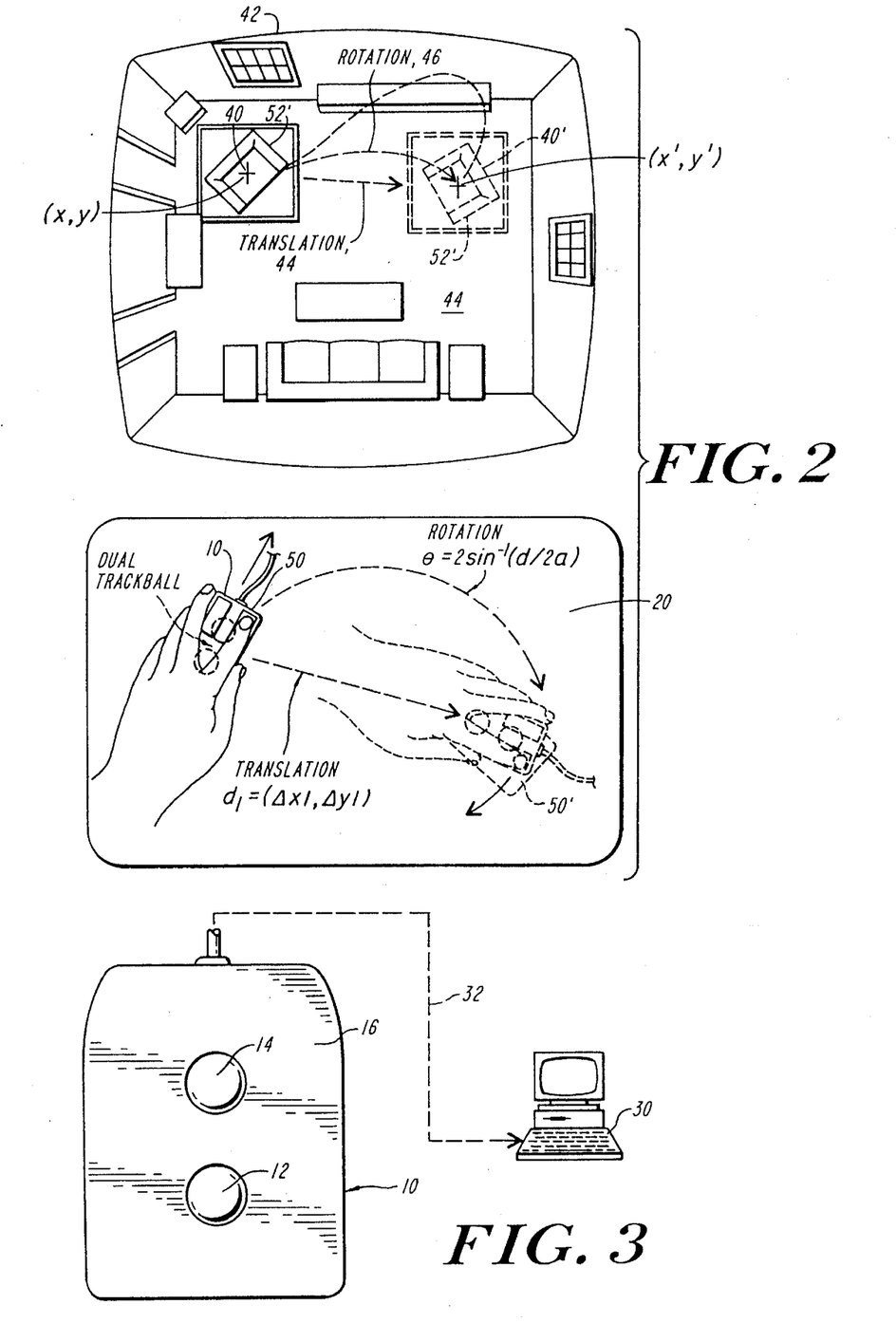
FIG. 2 is a diagrammatic illustration of the movement of the dual trackball mouse of FIG. 1, illustrating both mouse movement and corresponding movement of the designated image on the display.
FIG. 3 is a diagrammatic illustration of the connection of the dual trackball mouse of FIG. 1 to a computer, with attendant display.

Referring now to FIG. 2, in one application, an object 40 on screen 42 within a room 44 is translated and rotated with one mouse movement to a position 40' as illustrated in dotted outline. This requires translation of the object as illustrated by arrow 44 and a rotation of the object as illustrated by arrow 46.

As can be seen, mouse 10 is rotated over pad 20 such that the orientation and position of object 40 mimics that of the mouse as the mouse is moved across surface 20. This can be seen by examining edge 50 of mouse 10 which corresponds to the orientation of chair arm 52 of object 40. It can be seen that edge 50' corresponds to arm orientation 52' as the mouse is moved from one position to the other over surface 20.

The rotary encoders normally utilized in a single-trackball mouse converts the rotation of the ball into orthogonal distances based on the movement of the surface of the ball in these two orthogonal directions. This provides the $\Delta x$ and $\Delta y$ of the above equations. Having derived the translation of one of the trackballs in the two orthogonal directions, one can utilize this same information from a trackball physically removed from the first trackball to derive angular rotation of the mouse. Having thus being able to model or sense both the translation and rotation of the mouse simultaneously over a surface, it is relatively easy to make a corresponding object mimic the motion of the mouse.

Figure 4:
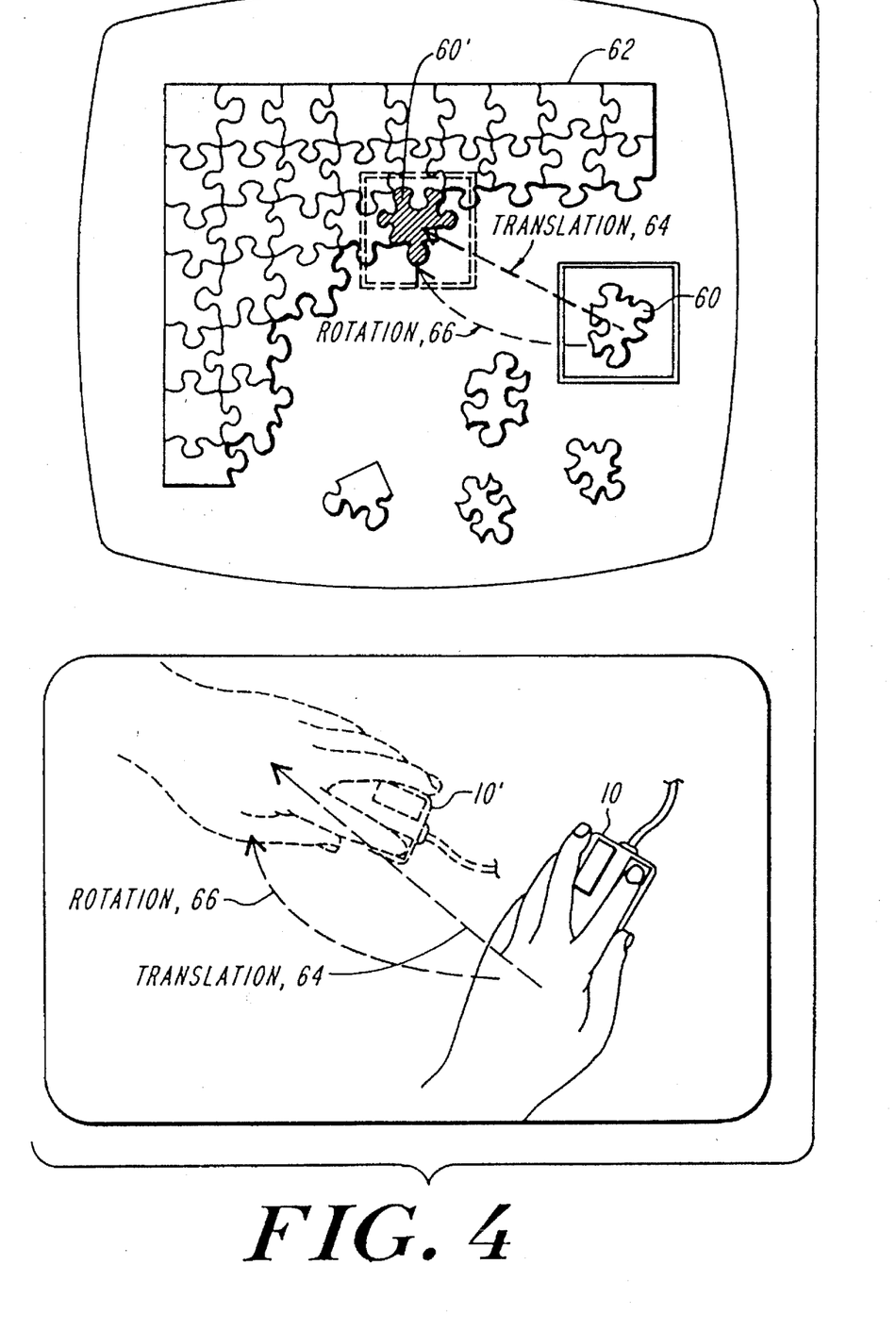
FIG. 4 is a diagrammatic illustration of the utilization of the dual trackball mouse of FIG. 1 to translate and rotate a jigsaw puzzle piece into the appropriate position within the puzzle.

Referring now to FIG. 4, in another application, a piece 60 of a jigsaw puzzle 62, is rotated and translated into place as illustrated at 60' through the corresponding translation and rotation of mouse 10 to position 10' through translation 64 and rotation 66. Thus in a two dimensional space, objects can be moved from one position to another in a single movement of a mouse or like locator device.

Applications for such a locator device extend to the arena of virtual reality in which an individual can seemingly navigate through a virtual reality scene with the simple movement of this specialized mouse. Movements of the mouse provide a change in the scene corresponding to the position and direction of the gaze as controlled by the mouse.

Figure 5:
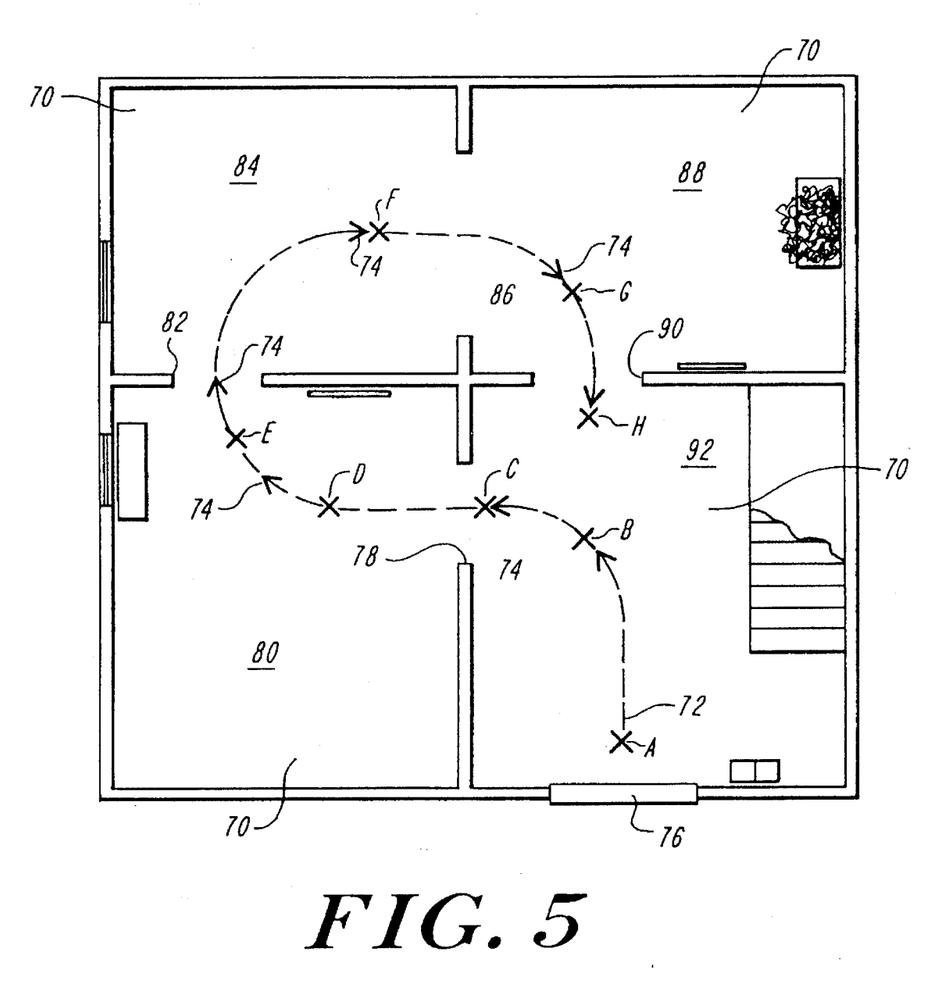
FIG. 5 is the top view of a room layout. A–H represents the path of an observer moving through the virtual building. Thus, the position and orientation of the gaze of the observer is controlled by a continuous, natural movement of the dual trackball mouse.
Figure 6:
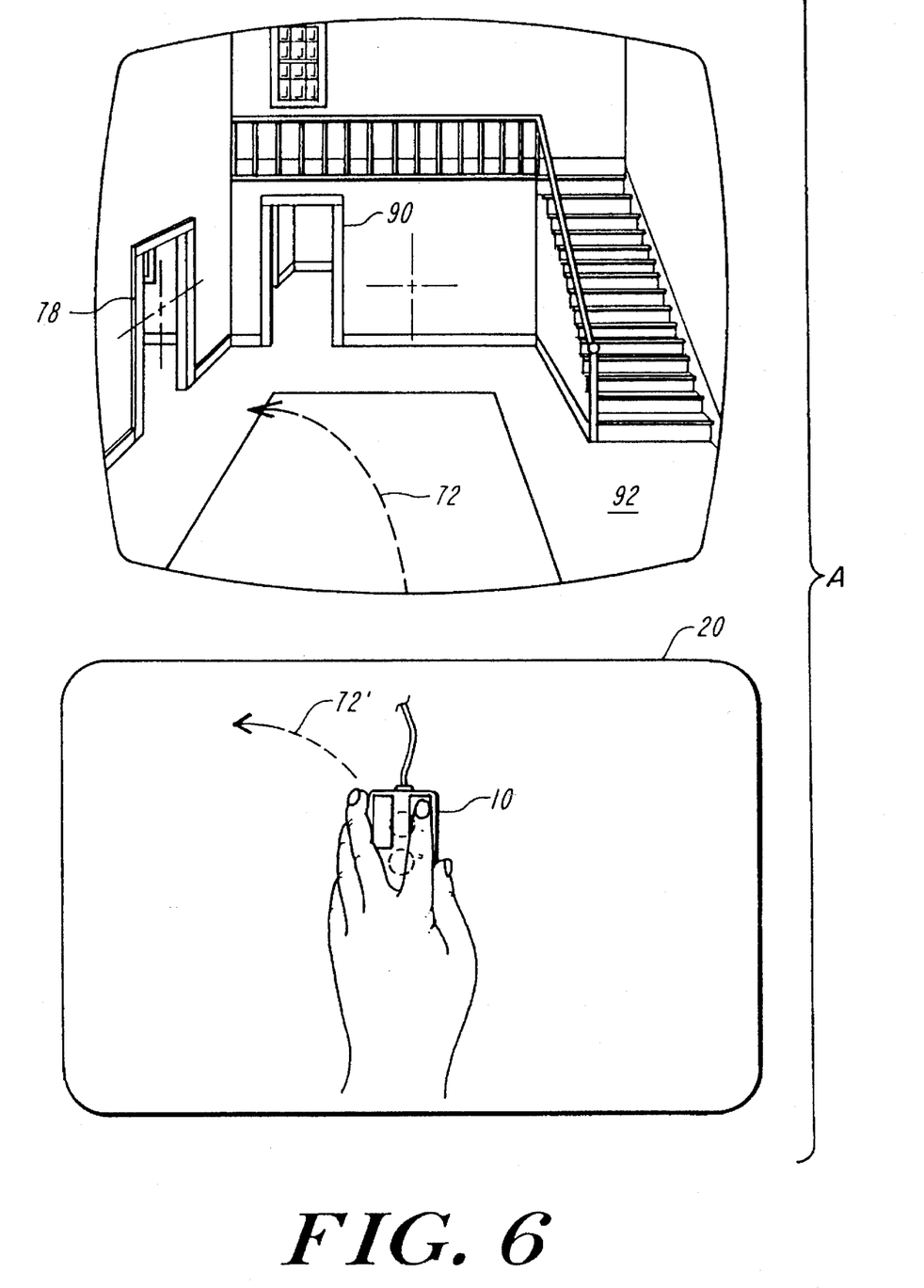
FIGS. 6–13 are diagrammatic illustrations showing scenes viewed by the observer at selected points A–H along the virtual path.
Figure 7:
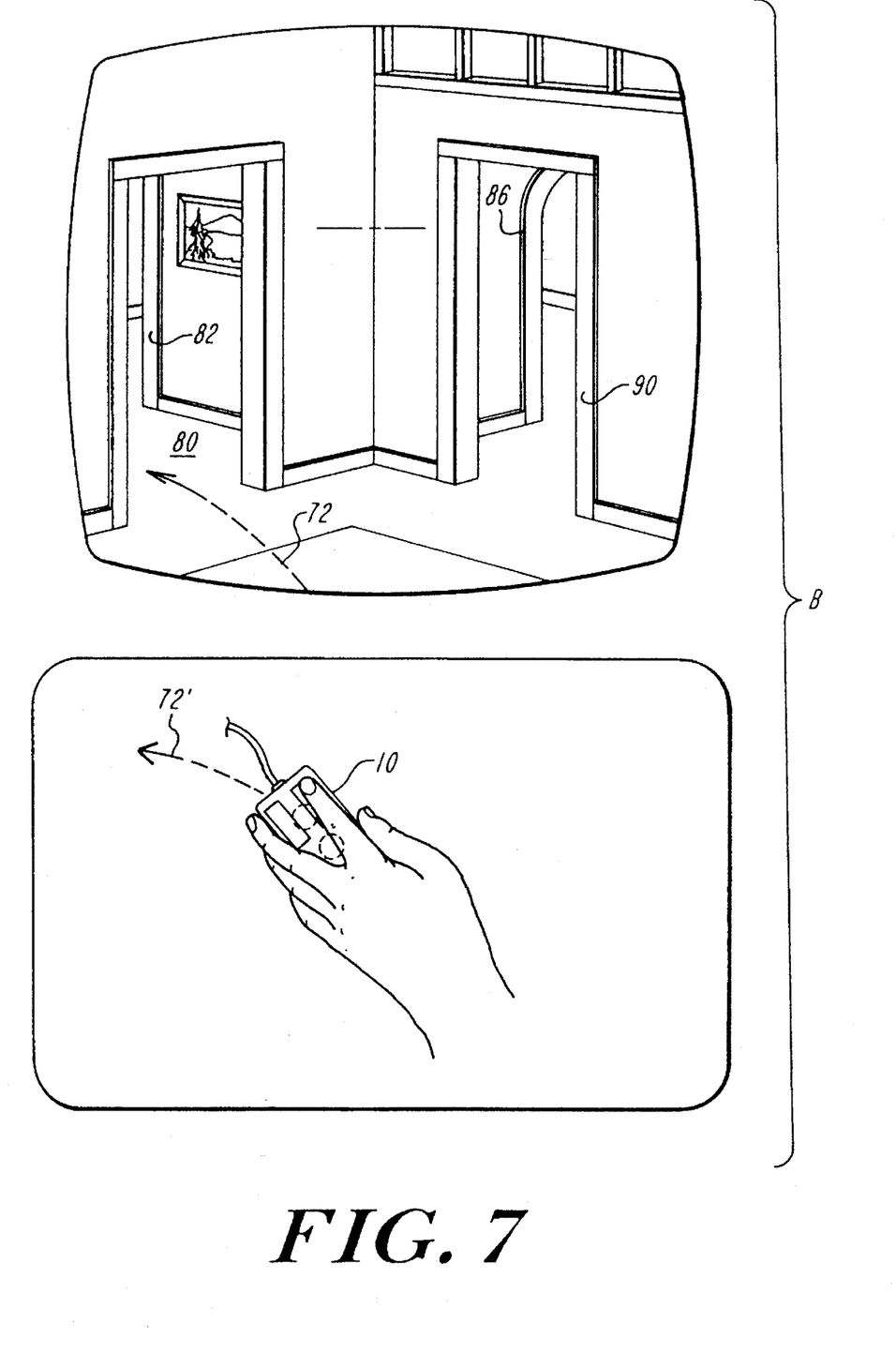
Figure 8:
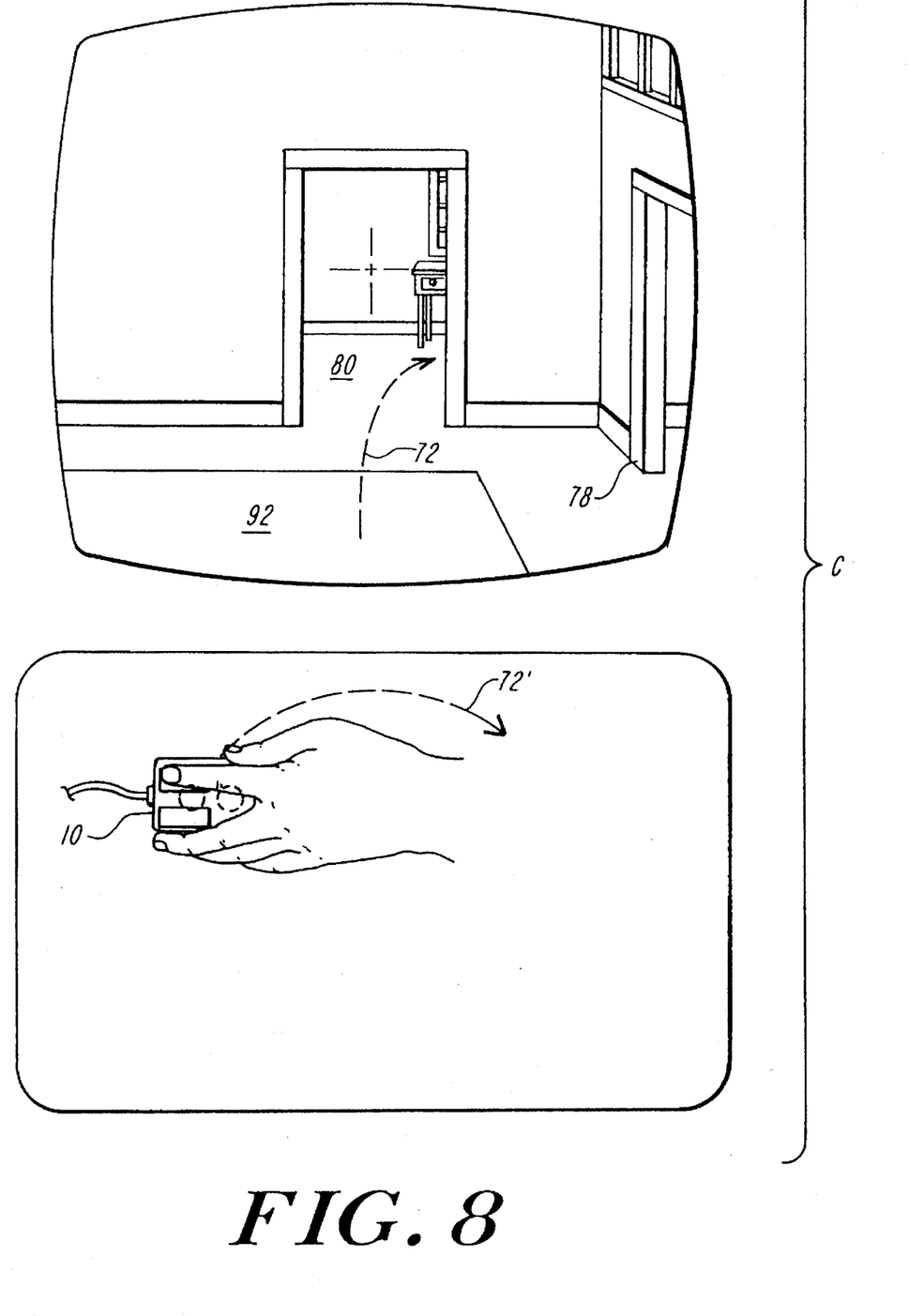
Figure 9:
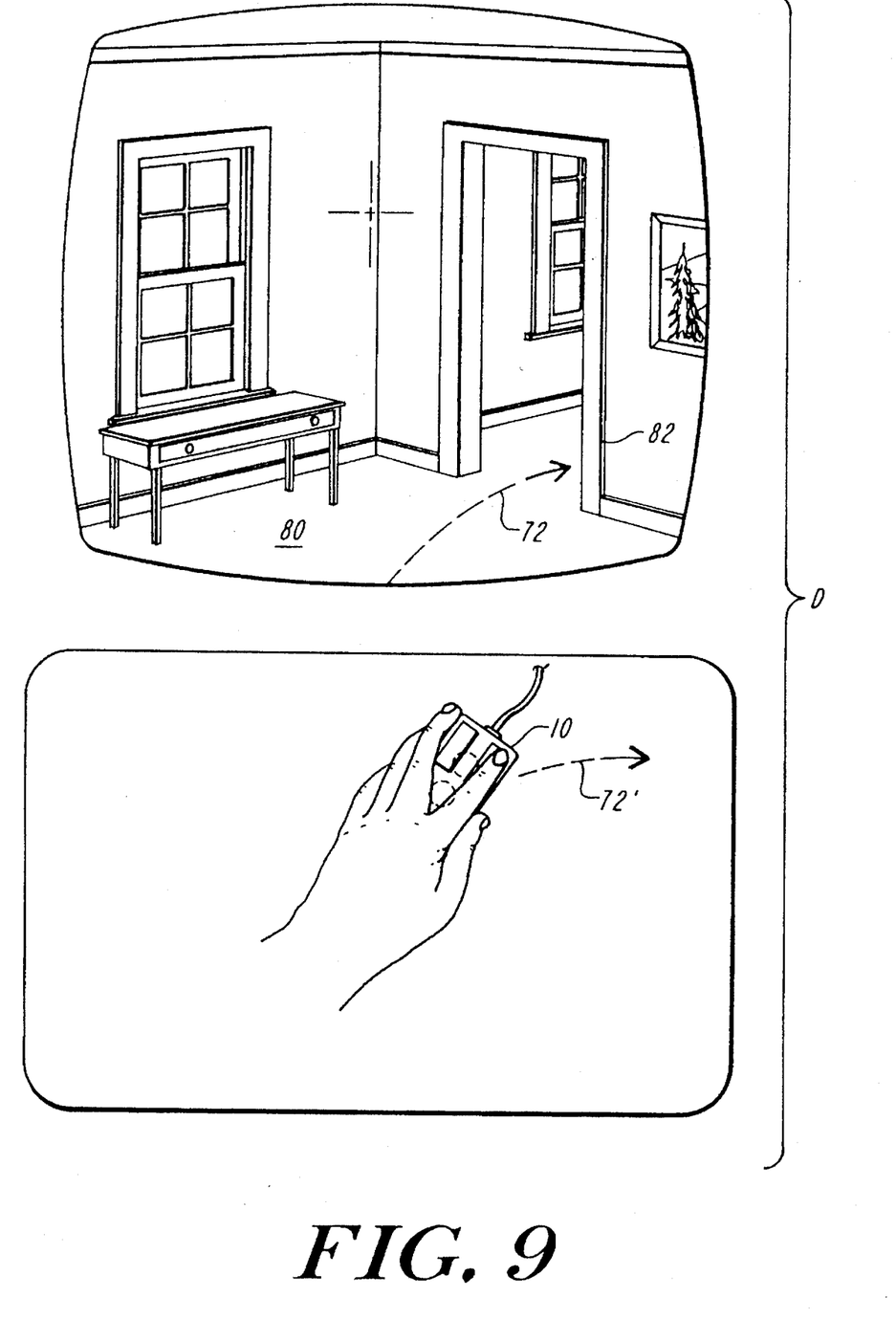
Figure 10:
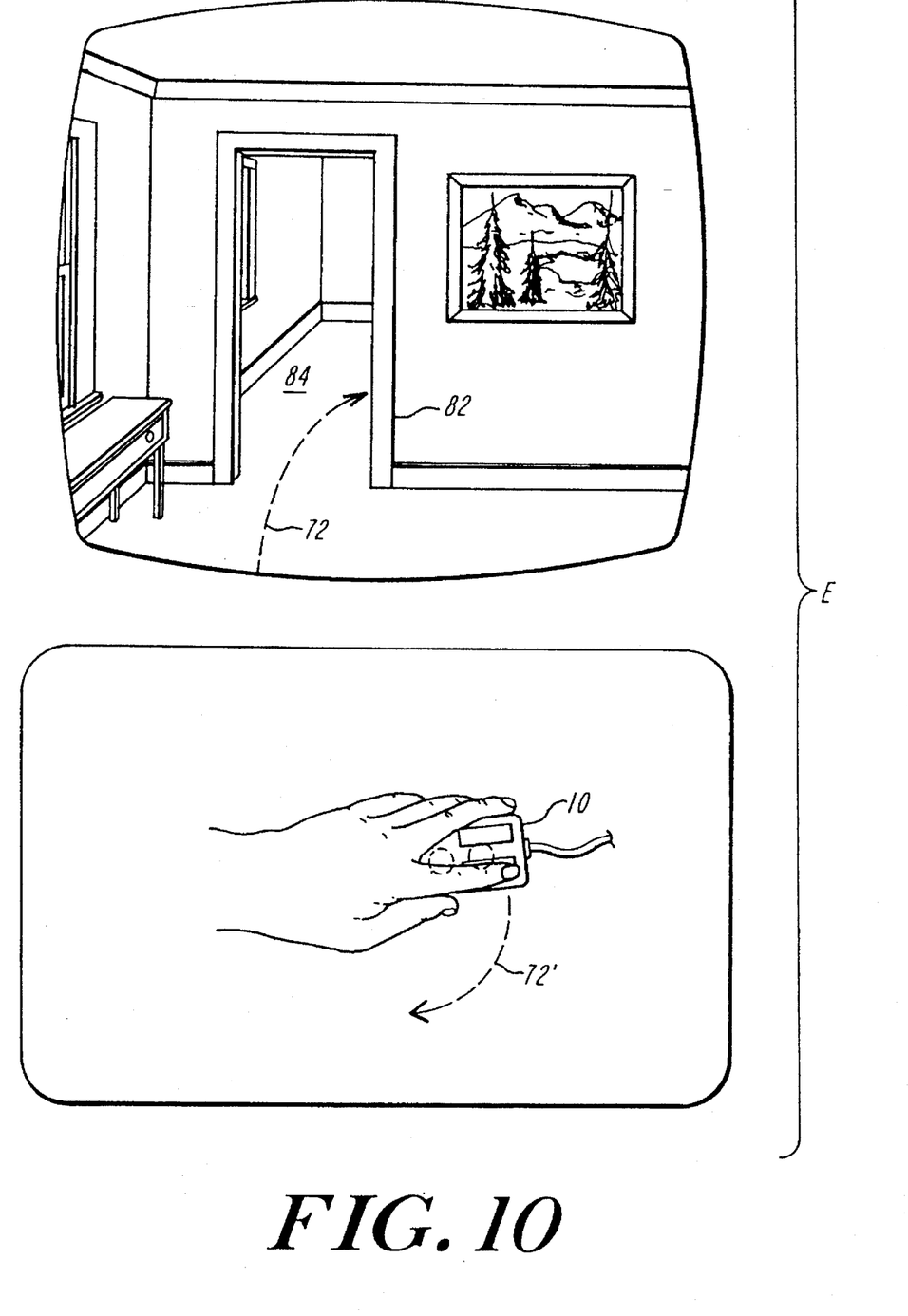
Figure 11:
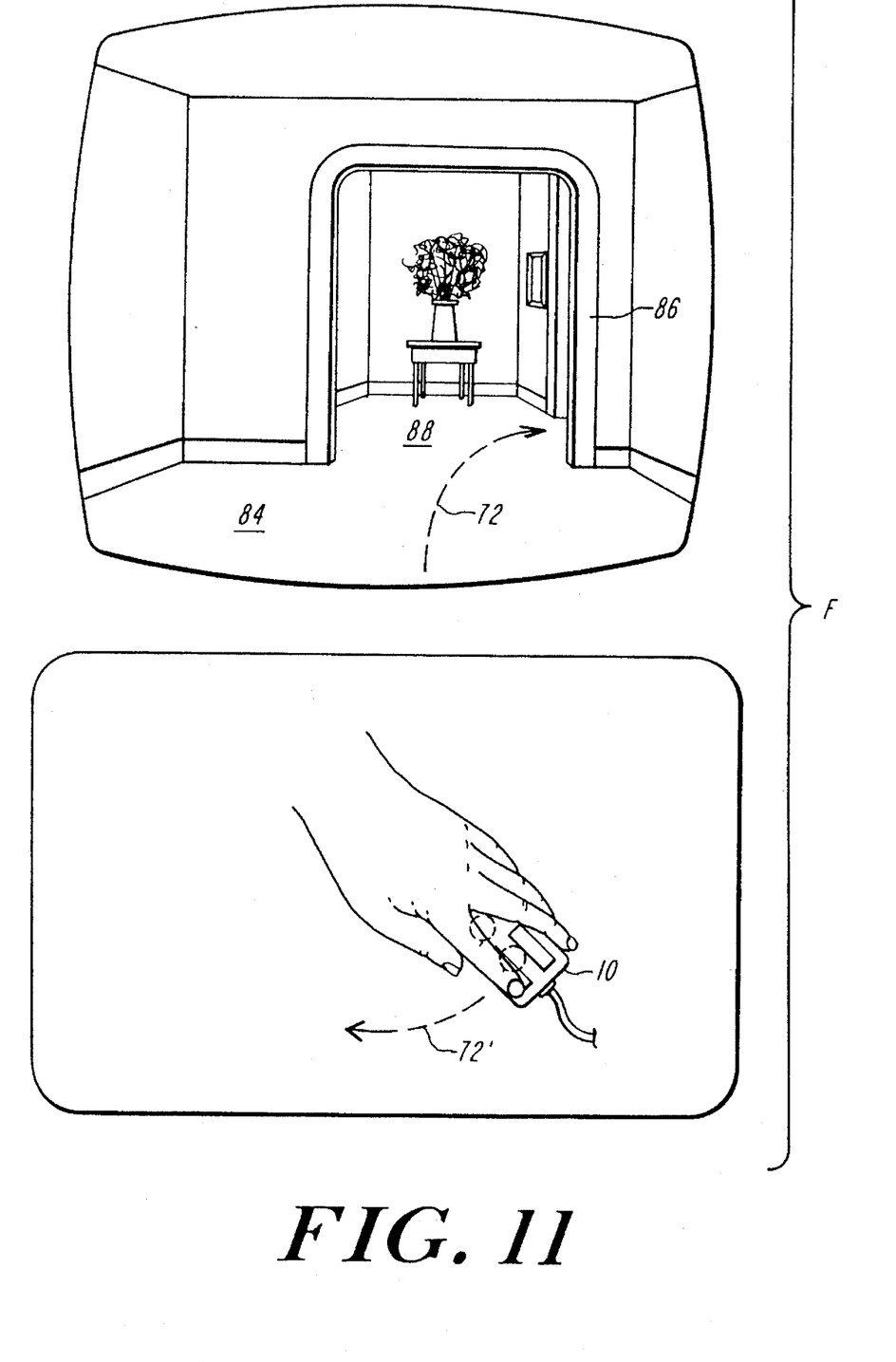
Figure 12:
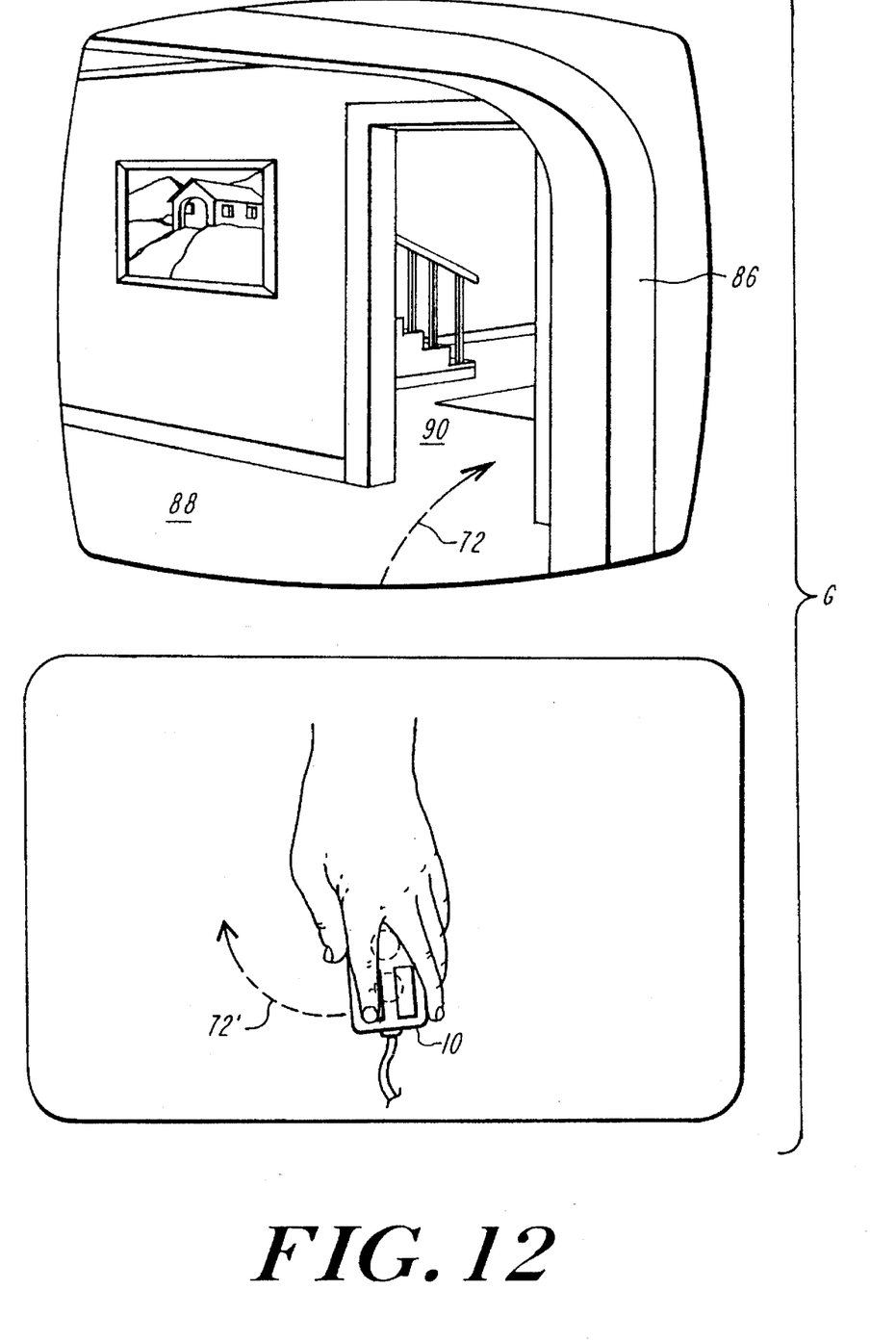
Figure 13:
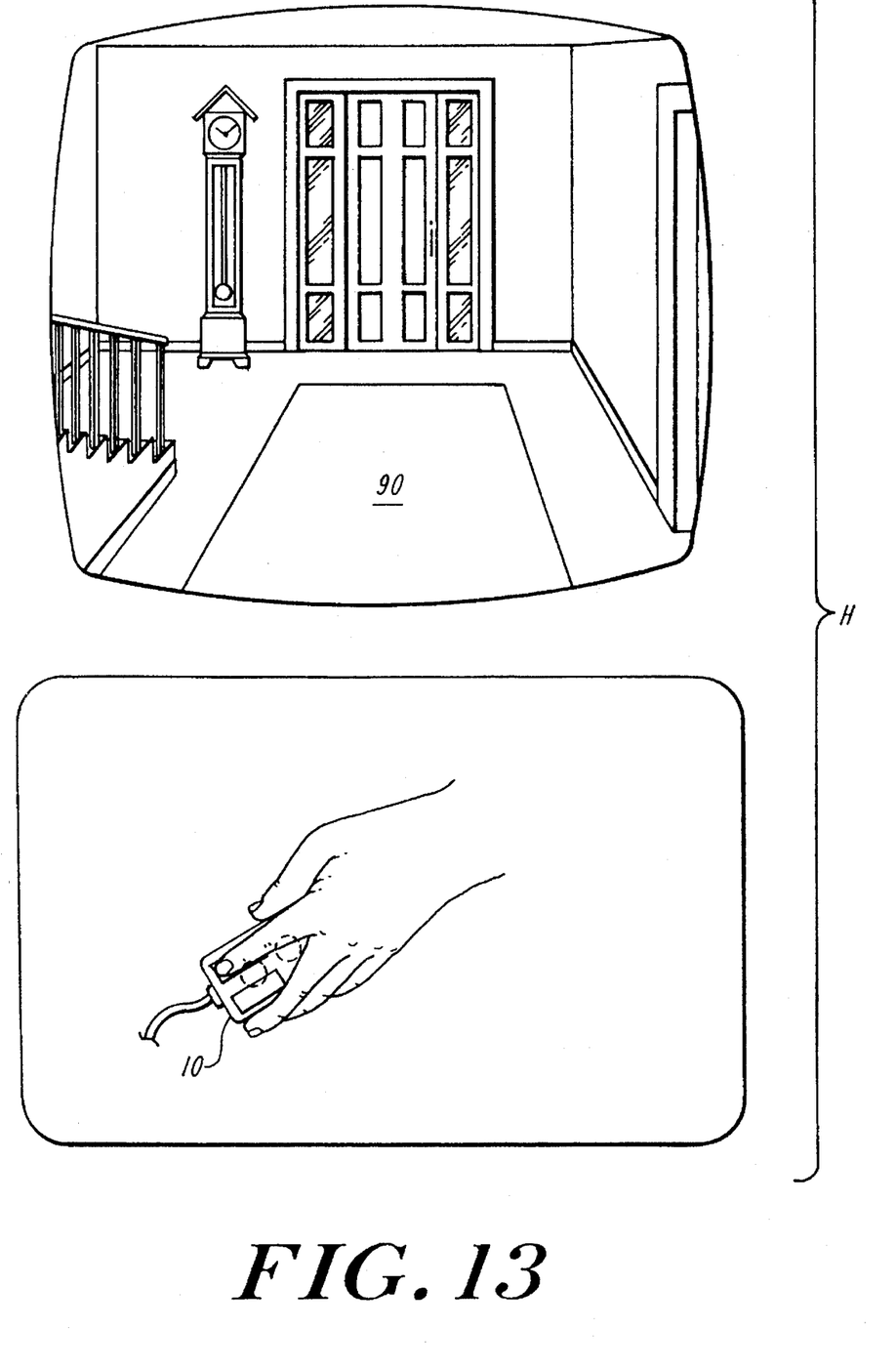

FIG. 5 illustrates such a virtual reality scene where the user navigates through a series of rooms 70 along the virtual path represented by the dotted line 72. It can be seen that the path of the points starts at a portal 76 and proceeds through a doorway 78 into a room 80; with the path then exiting room 80 through door 82 into room 84. The path then extends through a widened arch 86 into a room 88 and thence through door 90 back into the original foyer indicated by reference character 92.

In each of the succeeding figures, namely FIGS. 6–13, path 72 is established through the movement of mouse 10 along path 72' over surface 20. The gaze of the observer is in the direction of the path at any given point along the path. It is to be appreciated that in addition to control of the gaze and movement through the virtual space in the manner described above, it is also possible, by using mouse buttons in addition to mouse movement, to fix the gaze on a specific point or object and use the movement of the mouse to control only the virtual position of the observer. In this method, the scene is presented as if the observer walks along the dotted line while turning his/her head so that his/her gaze is constantly fixed on the selected object or position within the virtual scene. It is also to be appreciated that buttons on the mouse can be utilized to control such many other functions including: image zooming, object launching, or the control of specialized illumination.

Figure 14:
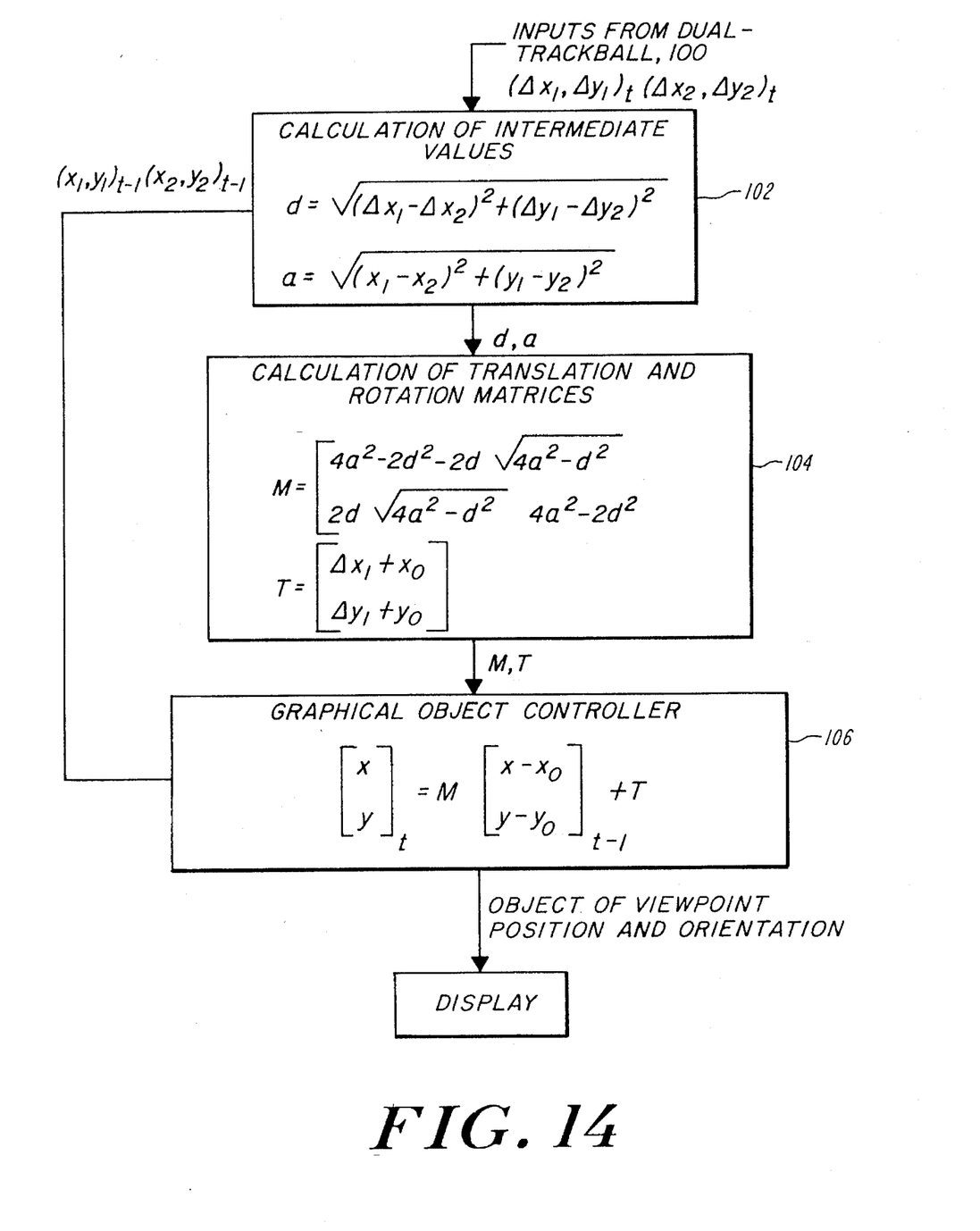
FIG. 14 is a block diagram illustrating one system for translating the outputs from a dual trackball mouse into translations and rotations of the graphical object selected to be moved and rotated.

Referring now to FIG. 14, a block diagram is shown for translating the outputs from the dual trackball mouse of FIG. 1 into translation and rotation of a graphical object. In this figure, inputs 100 from the dual trackball mouse are applied to a unit 102 which calculated intermediate values d and a.

These intermediate values are used in calculating the translation and rotation matrices M and T in unit 104.

Unit 104 calculates both the rotation matrix M and the translation vector T required to reposition and reorient the selected graphical object. Unit 106 shows how the object placement at time t is generated from the object placement at time t-1. This is accomplished by first rotating all points (x, y) in the graphical object by pre-multiplying by rotation matrix M and then by translating the resultant vector by the vector T.

More specifically, FIG. 14 illustrates one algorithm which provides intuitive translation of mouse movement to object placement is described here. In this example algorithm, the center of rotation of the graphical object is determined from the position of the locator device over the graphical object when the object is selected. After the object is selected and the center of rotation established, motions of the locator device are used to reposition the graphical object.

In this example algorithm, the center of rotation of the object lies at the position of one of the two sensors or sensor systems, called the primary sensor. The object transformation is then composed of a rotation of the object about the primary sensor position, (x1, y1), by the angle $\theta=2 \sin^{-1}(d/2a)$, followed by a translation of the rotated object by $d_1=(\Delta x1, \Delta y1)$, where:

$$d = \sqrt{(\Delta x1 - \Delta x2)^2 + (\Delta y1 - \Delta y2)^2}\ ,$$

and $$a = \sqrt{(x1 - x2)^2 + (y1 - y2)^2}\ .$$

The transformation of any point (x, y) in the original object onto its new position (x', y'), can be calculated using the matrix equation:

$$\begin{bmatrix} x' \\ y' \end{bmatrix} = M \begin{bmatrix} x \\ y \end{bmatrix} + T,$$

where, $$M = \begin{bmatrix} \cos\theta & -\sin\theta \\ \sin\theta & \cos\theta \end{bmatrix} = \frac{1}{4a^2} \begin{bmatrix} 4a^2 - 2d^2 & -2d\sqrt{4a^2 - d^2} \\ 2d\sqrt{4a^2 - d^2} & 4a^2 - 2d^2 \end{bmatrix},$$

and $$T = \begin{bmatrix} x_1 + \Delta x_1 \\ y_1 + \Delta y_1 \end{bmatrix} - M \begin{bmatrix} x_1 \\ y_1 \end{bmatrix}.$$

It will be appreciated that the above is only one of many algorithms that may be utilized given the information available from the dual, laterally displaced sensor systems such as provided by the dual trackball system. For example, a different mapping function could rotate the object about an arbitrary origin (or axis in 3D space) or could adjust the relative sensitivity of the object to translational and rotational movements of the locator device.

It will be appreciated that the center of rotation may be made to correspond to the center of mass of the object. Alternatively, this center of rotation can be made to correspond to a corner or other predetermined position on the graphical object or display. Moreover, the center of rotation can be made to correspond to any arbitrary point chosen interactively by the user.

While the subject invention has been described in detail in terms of a dual trackball mouse, simultaneous translation and rotation of a graphical object can be accomplished by any locator device having two sensor systems that are spaced apart at a fixed distance, and which both detect orthogonal pairs of position displacement or absolute position. Moreover, it will be appreciated that since the second sensor is placed at a fixed distance from the original sensor, the second sensor system actually only requires the ability to detect a single displacement or position (such as $\Delta x$ or x) since the second displacement or position ($\Delta y$ or y) could then be calculated from the known geometry.

Having now described a few embodiments of the invention, and some modifications and variations thereto it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

I claim:

1. Apparatus for the control of graphical objects appearing on a computer driven display, comprising:

a locator device for permitting simultaneous two-dimensional translation and rotation of said graphical object including spaced-apart rollerball sensors positioned on said locator device in a fixed relationship to each other on the same side of said locator device, each of said rollerball sensors including means for generating signals corresponding to rollerball movement for simultaneously generating an output corresponding to the angle associated with the angular orientation of said locator device and the translation of said locator device as said locator device is moved and rotated in a two-dimensional plane; and, means coupled to the output of said locator device for translating and rotating said graphical object in accordance with the sensed displacements of said sensors to mimic the angular rotation and displacement of said locator device, whereby the movement of said graphical object on said display is controlled by the movement of said locator device.

2. The apparatus of claim 1, wherein the output of said locator device is a pair of absolute positions of said sensors.

3. The apparatus of claim 1, wherein the output of said locator device is a pair of displacements of said sensors.

4. The apparatus of claim 3, wherein said means for moving said graphical object includes means for calculating translation and rotation matrices from said angle, said matrices controlling the position and orientation of said graphical object.

5. The apparatus of claim 4, wherein said matrix corresponding to the rotation of said graphical object by $\theta$ is given by the matrix:

$$M = \begin{bmatrix} \cos\theta & -\sin\theta \\ \sin\theta & \cos\theta \end{bmatrix} = \frac{1}{4a^2} \begin{bmatrix} 4a^2 - 2d^2 & -2d\sqrt{4a^2 - d^2} \\ 2d\sqrt{4a^2 - d^2} & 4a^2 - 2d^2 \end{bmatrix},$$

where $$d = \sqrt{(\Delta x1 - \Delta x2)^2 + (\Delta y1 - \Delta y2)^2},$$

and $$a = \sqrt{(x1 - x2)^2 + (y1 - y2)^2}$$

and where x and y denote the positions of respective sensors at respective positions 1 and 2, and $\Delta x$ and $\Delta y$ denote translations of said sensors.

6. The apparatus of claim 1, wherein said locator device includes a mouse which has multiple rollerballs.

7. The apparatus of claim 1, wherein said locator device includes light sensors.

8. The apparatus of claim 1, wherein said locator device includes rotary encoders.

9. The apparatus of claim 1, and further including means for selecting a graphical object on said display for translation and rotation thereof and means for establishing the point about which said object is to be rotated.

10. The apparatus of claim 9, wherein said means for establishing the point about which said object is rotated includes means for determining center of mass of said object and means for establishing said point as said center of mass.

11. The apparatus of claim 9, wherein said means for establishing the point about which said object is rotated includes means for establishing said point of rotation as a predetermined point at said object.

12. The apparatus of claim 11, wherein said predetermined point is a corner of said object.

13. The apparatus of claim 11, wherein said predetermined point is the geographic center of said object.

14. The apparatus of claim 11, and further including means at said locator for selecting the object to be translated and rotated and for establishing on said object the position of said predetermined point.

* * * * *